United States Patent
Bonnet et al.

(10) Patent No.: US 7,867,604 B2
(45) Date of Patent: *Jan. 11, 2011

(54) COMPOSITION COEXTRUDABLE WITH PVDF AND HAVING NO STRESS-WHITENING EFFECT

(75) Inventors: Anthony Bonnet, Beaumont le Roger (FR); Karine Triballier, Saint Eloi de Fourques (FR); Johann Laffargue, Bernay (FR); Francois Beaume, Bernay (FR); Karine Loyen, Pont-Audemer (FR); Sandrine Duc, Paris (FR)

(73) Assignee: Arkema France, Colombes (FR)

( * ) Notice: Subject to any disclaimer, the term of this patent is extended or adjusted under 35 U.S.C. 154(b) by 525 days.

This patent is subject to a terminal disclaimer.

(21) Appl. No.: 11/058,932

(22) Filed: Feb. 16, 2005

(65) Prior Publication Data

US 2005/0187354 A1 Aug. 25, 2005

Related U.S. Application Data

(60) Provisional application No. 60/570,635, filed on May 13, 2004.

(30) Foreign Application Priority Data

Feb. 20, 2004 (FR) .................................. 04 01726

(51) Int. Cl.
*B32B 7/02* (2006.01)
(52) U.S. Cl. ........................ 428/212; 428/216; 428/421; 428/520
(58) Field of Classification Search ................ 525/199, 525/222, 227; 428/216, 421, 522, 195.1, 428/520, 212
See application file for complete search history.

(56) References Cited

U.S. PATENT DOCUMENTS

| | | | |
|---|---|---|---|
| 3,524,906 A * | 8/1970 | Miller, Jr. et al. ........... | 525/199 |
| 4,226,904 A | 10/1980 | Ollivier et al. | |
| 4,251,619 A * | 2/1981 | Kurita ........................ | 430/292 |
| 4,364,886 A | 12/1982 | Strassel | |
| 4,415,519 A | 11/1983 | Strassel | |
| 5,256,472 A | 10/1993 | Moriya et al. | |
| 5,569,524 A | 10/1996 | Akatsu et al. | |
| 6,254,712 B1 | 7/2001 | Enlow et al. | |
| 6,524,686 B2 | 2/2003 | Strassel | |
| 6,811,859 B2 | 11/2004 | Bonnet et al. | |
| 7,179,863 B2 * | 2/2007 | Bonnet et al. ................ | 525/222 |
| 2001/0044004 A1 * | 11/2001 | Arakawa et al. ........... | 428/65.1 |
| 2004/0086721 A1 | 5/2004 | Bonnet et al. | |

FOREIGN PATENT DOCUMENTS

| | | | |
|---|---|---|---|
| GB | 1578517 | | 5/1978 |
| JP | 550566 | | 7/1991 |
| JP | 03181581 A | * | 8/1991 |

* cited by examiner

*Primary Examiner*—Mark Ruthkosky
*Assistant Examiner*—Gerard T Higgins
(74) *Attorney, Agent, or Firm*—Thomas F. Roland

(57) ABSTRACT

The present invention relates to a composition coextrudable with PVDF and comprising: 30 to 50 parts of PVDF; 70 to 50 parts of a copolymer comprising, by weight, 90 to 50% of methyl methacrylate (MMA) per 10 to 50% of an alkyl (meth) acrylate respectively, the alkyl having from 2 to 24 carbon atoms; 1 to 4 parts of a UV absorber; the total making 100 parts. The invention also relates to coextruded films consisting of this composition as the adhesive layer and a PVDF-based layer of 50 to 100 parts of PVDF per 50 to 0 parts of PMMA respectively. These films possess mechanical properties sufficient to allow them to be used as a coating transparent to visible light but opaque to UV radiation.

4 Claims, No Drawings

COMPOSITION COEXTRUDABLE WITH PVDF AND HAVING NO STRESS-WHITENING EFFECT

This application claims benefit, under U.S.C. §119(a) of French National Application Number 04.01726, filed Feb. 20, 2004; and also claims benefit, under U.S.C. §119(e) of U.S. provisional application 60/570,635 filed May 13, 2004.

FIELD OF THE INVENTION

PVDF (polyvinylidene fluoride) because of its very good weatherablity, radiation resistance and chemical resistance is used to protect articles or materials. In addition, it is appreciated for its glossy appearance and its resistance to graffiti. This has therefore led all kinds of substrates to be coated with a PVDF film. However, PVDF adheres very poorly to most substrates and it is therefore necessary to place an adhesive composition between the PVDF and the substrate. The present invention relates to this composition.

Advantageously, this composition is coextruded with the PVDF in order to form a two-layer film, and then this film is attached to the substrate, for example by hot pressing. The two-layer film may also be placed in a mould, the PVDF layer being placed against the wall of the mould, and then the substrate may be injected in the melt state into the mould. It is also possible, depending on the nature of the substrate, to coextrude the PVDF, the adhesive composition and the substrate in order to obtain the PVDF-coated substrate directly, with the adhesive composition being between the PVDF and the substrate.

BACKGROUND OF THE INVENTION

The PVDF/adhesive composition bilayer film must sometimes be folded or stretched before being fixed to the substrate. It must also sometimes be folded or stretched before being placed in a mould into which the substrate is then injected. According to another possibility, the substrate once coated must sometimes be folded. The folding or stretching causes whitening.

The prior art has already described coating substrates with PVDF films, but has never mentioned the problem of whitening.

Patent GB 1 578 517 describes an ABS coated with a PVDF film, a polyurethane layer possibly being placed between the PVDF and the ABS.

U.S. Pat. No. 4,226,904 describes a PMMA covered with a PVDF film. To improve the adhesion, a PMMA solution in dimethylformamide is deposited on the PVDF film and, after the solvent has evaporated, the PVDF film is pressed onto the PMMA.

U.S. Pat. No. 4,415,519 describes an ABS or PVC substrate covered with a PVDF film, an adhesive being placed between the PVDF and the substrate. This adhesive may be either PMMA or a blend of 40% PMMA, 30% PVDF, and 30% ABS by weight, or else a blend consisting of 30% PMMA, 40% of a polyacrylic derivative and 30% ABS by weight.

U.S. Pat. No. 4,364,886 describes an ABS or unsaturated polyester substrate covered with a PVDF film, an adhesive being placed between the PVDF and the substrate. This adhesive is a blend of 30% PMMA, 40% of an acrylic elastomer and 30% ABS by weight.

U.S. Pat. No. 5,242,976 describes a composition coextrudable with PVDF in order to make it adhere to substrates. The composition is a blend of 27 to 50% PMMA, 17.5 to 36.5% PVDF and 25 to 47.45% of an acrylic elastomer by weight.

In all the above documents of the prior art, there is no mentioned of UV stabilisers in the adhesive composition.

U.S. Pat. No. 6,524,686 describes PVDF-coated substrates; the structure comprises, in succession, the substrate, an adhesive layer, a PVDF layer made opaque to UV and to visible radiation and a PVDF layer. The opaque PVDF layer is obtained by adding a product chosen from metal oxides, pigments and benzophenones to the PVDF. The examples illustrate only PVDF filled with 15% by weight of zinc oxide.

U.S. Pat. No. 5,256,472 describes two-layer films comprising a first layer essentially consisting of PVDF and of a minor amount of PMMA and a second layer intended to ensure adhesion to a substrate. This adhesive layer consists by weight of 50 to 95 (preferably 70 to 90) parts of PMMA, 5 to 50 (preferably 10 to 30) parts of PVDF and 0.1 to 15 parts of a UV absorber. It is explained that the presence of the UV absorber is necessary because this adhesive layer is sensitive to radiation and that if no UV absorber is included then the adhesive is destroyed and the layer essentially consisting of PVDF debonds from the substrate. The term "PMMA" denotes methyl methacrylate homopolymers or methyl methacrylate copolymers with a copolymerisable monomer and also blends with an acrylate rubber, but without specifying the proportions of PMMA and of rubber. It is also specified that if the proportion of PMMA is less than 50 parts, the UV stabiliser exudes. That document does not specify the latter, but this exudation impairs the transparency of the films and above all causes debonding.

U.S. Pat. No. 6,811,859 describes a composition coextrudable with PVDF and comprising: 20 to 40 parts of PVDF; 40 to 60 parts of PMMA; 5 to 18 parts of an acrylic elastomer; 1 to 4 parts of a UV absorber, the total making 100 parts. It also describes coextruded films consisting of:
   a layer of the above coextrudable composition (also called the adhesive layer) and, directly attached to the latter,
   a layer based on PVDF comprising, as main constituents, 50 to 100 parts of PVDF per 50 to 0 parts of PMMA, respectively.

In the prior art, there has never been any mention of the compromise that there must be in terms of transparency, mechanical properties and above all non-whitening when the object obtained is folded. There has now been found a composition coextrudable with PVDF that is flexible, transparent and does not undergo any whitening when the film is folded or stretched and exhibits an excellent compromise between elongation at break, transparency and UV protection.

SUMMARY OF THE INVENTION

The present invention relates to a composition coextrudable with PVDF and comprising:
   30 to 50 parts of PVDF;
   70 to 50 parts of a copolymer (A) comprising, by weight, 90 to 50% of methyl methacrylate (MMA) per 10 to 50% of an alkyl (meth)acrylate respectively, the alkyl having from 2 to 24 carbon atoms;
   1 to 4 parts of a UV absorber;
   the total making 100 parts.

The invention also relates to coextruded films consisting of:
   a layer of the above coextrudable composition (also called adhesive layer) and, directly attached to the said layer,
   a PVDF-based layer comprising, as main constituents, 50 to 100 parts of PVDF per 50 to 0 parts of PMMA respectively (this layer is also called for simplification "PVDF layer").

According to a second form of the invention, the PVDF layer is in the form of two layers:
- one placed against the coextrudable layer and comprising, as main constituents, 50 to 90 parts of PVDF per 50 to 10 parts of PMMA respectively; and
- the other (also called the outer layer) comprising, as main constituents, 75 to 100 parts of PVDF per 25 to 0 parts of PMMA respectively.

These films possess mechanical properties sufficient to allow them to be handled, to be processed and to be used as a coating transparent to visible light but opaque to UV radiation. The composition of the adhesive layer is based on the use of a polymethyl methacrylate copolymerized with a flexible acrylate making it possible to obtain a binding formulation exhibiting a compromise of properties between the transparency of the film, its good mechanical integrity and its ability not to whiten when it is subjected to a large deformation.

The invention also relates to the substrates coated with this film, the coextrudable (adhesive) composition being placed against the substrate.

The invention also relates to the use of this composition coextrudable with PVDF to make PVDF-based films adhere to substrates.

DETAILED DESCRIPTION OF THE INVENTION

With regard to PVDF, this term denotes PVDFs, vinylidene fluoride (VDF) homopolymers and vinylidene fluoride (VDF) copolymers preferably containing at least 50% by weight of VDF and at least one other monomer copolymerisable with VDF.

Advantageously, the comonomer is fluorinated and may be chosen, for example, from the vinyl fluoride; trifluoroethylene (VF3); chlorotrifluoroethylene (CTFE); 1,2-difluoroethylene; tetrafluoroethylene (TFE); hexafluoropropylene (HFP); perfluoro(alkyl)vinyl ethers, such as perfluoro(methyl)vinyl ether (PMVE), perfluoro(ethyl) vinyl ether (PEVE) and perfluoro(propyl)vinyl ether (PPVE); perfluoro(1,3-dioxole); perfluoro(2,2-dimethyl-1,3-dioxole) (PDD). Preferably, the possible comonomer is chosen from chlorotrifluoroethylene (CTFE), hexafluoroproylene (HFP), trifluoroethylene (VF3) and tetrafluoroethylene (TFE).

Preferably, the PVDF contains, by weight, at least 50%, more preferentially, at least 75% and better still at least 85% of VDF. The comonomer is advantageously HFP.

Advantageously, the PVDF has a viscosity ranging from 100 Pa·s to 2000 Pa·s, the viscosity being measured at 230° C. at a shear rate of 100 s$^{-1}$ using a capillary rheometer. This is because these PVDFs are well suited to extrusion and to injection moulding. Preferably, the PVDF has a viscosity ranging from 300 Pa·s to 1200 Pa·s, the viscosity being measured at 230° C. at a shear rate of 100 s$^{-1}$ using a capillary rheometer.

With regard to the copolymer (A), this advantageously comprises, by weight, 85 to 70% of methyl methacrylate per 15 to 30% of an alkyl (meth)acrylate respectively, the alkyl having from 2 to 24 carbon atoms. It preferably comprises, by weight, 80 to 70% of methyl methacrylate per 20 to 30% of an alkyl (meth)acrylate respectively, the alkyl having from 2 to 24 carbon atoms. By way of example of an alkyl (meth) acrylate, the alkyl having from 2 to 24 carbon atoms, mention may be made of butyl acrylate, 2-ethylhexyl acrylate, n-octyl acrylate, hydroxyethyl acrylate and 2-ethylhexyl methacrylate. The MVI (melt volume index) may be between 2 and 15 cm$^3$/10 min measured at 230° C. under a load of 3.8 kg. The copolymer (A) may be a random copolymer, that is to say the MMA and the other monomer (the (meth)acrylate of an alkyl having from 2 to 24 carbon atoms) are distributed randomly. The copolymer (A) may be a block copolymer, that is to say there are PMMA blocks and blocks of the other monomer. With regard to this block copolymer (A), it is advantageous to use a triblock comprising a PMMA block, a block of the other monomer and a PMMA block. Preferably, this is a PMMA-b-poly(butyl acrylate)-b-PMMA triblock copolymer. These block copolymers may be manufactured by anionic polymerization or by controlled radical polymerization. The copolymer (A) may be blended with conventional PMMA, as defined in the following paragraph provided that the amount of conventional PMMA does not cause whitening under the folding and stretching conditions, as explained above.

With regard to PMMA, this term denotes methyl methacrylate homopolymers and copolymers containing at least 50% methyl methacrylate by weight. As examples of comonomers, mention may be made, for example, of alkyl(meth) acrylates, acrylonitrile, butadiene, styrene and isoprene. Examples of alkyl(meth)acrylates are described in Kirk-Othmer Encyclopaedia of Chemical Technology, 4$^{th}$ Edition in Vol. 1, pages 292-293 and in Vol. 16, pages 475-478. Advantageously, the PMMA may contain 0 to 20%, preferably 5 to 15%, most preferably 10 to 15% of methyl acrylate and/or ethyl acrylate by weight. The PMMA may be functionalised, that is to say it contains, for example, acid, acid chloride, alcohol or anhydride functional groups. These functional groups may be introduced by grafting or by copolymerisation of MMA and a monomer bearing one of these functional groups. Advantageously, this is an acid functional group provided by the acrylic or methacrylic acid comonomer. Two neighbouring acrylic or methacrylic acid functional groups may lose water to form an anhydride. The proportion of functional groups may be between 0 and 15% by weight of the PMMA containing the optional functional groups. The MVI (melt volume index) of the PMMA may be between 2 and 15 cm$^3$/10 min measured at 230° C. under a load of 3.8 kg.

As regards the UV absorber, these are products known per se. Such products are cited in the U.S. Pat. No. 5,256,472. Advantageously, benzotriazoles and benzophenones are used. As an example, TINUVIN® 213 or TINUVIN® 109 and preferably TINUVIN® 234 from Ciba Specialty Chemicals may be used.

The composition coextrudable with PVDF advantageously comprises:
- 40 to 50 parts of PVDF;
- 60 to 50 parts of a copolymer (A) comprising, by weight, 90 to 50% of methyl methacrylate per 10 to 50% of an alkyl (meth)acrylate respectively, the alkyl having from 2 to 24 carbon atoms;
- 1 to 4 parts of a UV absorber;
- the total making 100 parts.

The coextrudable composition with PVDF (or adhesive layer) contains no core-shell type impact modifier in order to suppress the whitening. The coextrudable composition may be prepared by melt blending the PVDF and the copolymer (A) to which the UV absorber is added. Advantageously, thermoplastic mixers are used. The same applies to the layers based on PVDF and on PMMA.

With regard to the coextruded film consisting of the coextrudable composition and the PVDF layer, the thickness of the PVDF layer is advantageously between 2 and 50 µm, preferably between 2 and 30 µm, and that of the coextrudable composition between 10 and 100 µm, preferably between 10 and 70 µm.

Advantageously, the PVDF base layer comprises, as main constituents, 70 to 100 parts of PVDF per 30 to 0 parts of PMMA respectively and preferably 75 to 85 parts of PVDF per 25 to 15 parts of PMMA respectively.

According to a second form of the invention, the PVDF layer is in the form of two layers:
   one placed against the coextrudable layer and comprising, as main constituents, 50 to 90 parts of PVDF per 50 to 10 parts of PMMA respectively; and
   the other (also called the outer layer) comprising, as main constituents, 75 to 100 parts of PVDF per 25 to 0 parts of PMMA respectively.

That is to say the films of the invention comprise, in the following order:
   a coextrudable layer of the composition of the invention (the adhesive layer);
   a layer placed against the coextrudable layer and comprising, as main constituents, 50 to 90 parts of PVDF per 50 to 10 parts of PMMA respectively; and
   a layer (also called the outer layer) comprising, as main constituents, 75 to 100 parts of PVDF per 25 to 0 parts of PMMA respectively.

The outer layer advantageously comprises, as main constituents, 85 to 100 parts of PVDF per 15 to 0 parts of PMMA respectively and preferably 90 to 100 parts of PVDF per 10 to 0 parts of PMMA respectively.

The thickness of the layer of coextrudable composition is advantageously between 10 and 100 μm, preferably between 10 and 70 μm, and that of each of the other layers is advantageously between 2 and 50 μm, preferably between 2 and 30 μm.

The invention also relates to the substrates coated with this film, the coextrudable composition being placed against the substrate.

With regard to the substrate, mention may be made, by way of example, of:
   chlorinated polymers: PVC, PVC plastic, chlorinated PE;
   polymers and copolymers containing styrene, such as ABS, SAN, PS;
   saturated polyesters (PET, PBT, etc.) and copolyesters or blends, unsaturated polyester resins (SMC);
   epoxy and phenolic resins;
   ethylene/alkyl acrylate or ethylene/vinyl acetate copolymers (e.g. EMA or EVA), which are functionalised or unfunctionalised;
   PAs (polyamides) and CoPAs (copolyamides), PEBA, polyesteramides and TPU (thermoplastic polyurethane);
   EVOH (ethylene/vinyl alcohol) copolymer;
   aluminium, steel or mixtures of metals;
   lignin-based composites;
   acrylic compounds (PMMA, etc.)
   glass;
   PVC and PU foams.

EXAMPLES

The following products were used:
   KYNAR® 740: a PVDF homopolymer from Atofina having an MVI (Melt Volume Index) of 1.1 cm$^3$/10 min (230° C., 5 kg);
   OROGLAS® BS8: a PMMA from Atoglas having an MVI of 4.5 cm$^3$/10 min (230° C.; 3.8 kg) in bead form containing 6% of a methyl acrylate comonomer. This PMMA contains no core-shell type impact modifier.
   TINUVIN® 213: a UV absorber of the (hydroxyphenyl) benzotriazole type sold by Ciba Specialty Chemicals;
   TINUVIN® 234: a UV absorber of the (hydroxyphenyl) benzotriazole type sold by Ciba Specialty Chemicals;
   KYNARFLEX® 2850: a PVDF copolymer (the comonomer is HFP) having an MVI of 0.5 cm$^3$/10 min (230° C.; 5 kg);
   KYNARFLEX® 2800: a PVDF copolymer (the comonomer is HFP) having an MVI of 1.1 cm$^3$/10 min (230° C.; 5 kg);
   D320: the abbreviation for DURASTRENGTH® D320, denoting a soft/hard core-shell elastomer whose core is a butyl acrylate/butadiene copolymer and whose shell is made of PMMA, 80 nm in size, sold by CECA.

The compositions in the examples are in % by weight.

Example 1

According to the Invention

A two-layer film containing a layer composed of 80% KYNAR® 720 PVDF and 20% OROGLAS BS8, 15 μm in thickness, and a binder 35 μm in thickness according to the following formulation: 48.6% KYNAR® 740, 48.6% of an ethyl acrylate/MMA copolymer having 25% by weight of ethyl acrylate, and 2.8% of TINUVIN 234. This film has an elongation at break of 250%, a haze of 2 and, after seven days spent in an oven, no exudation is observable. This film has a UV absorbance sufficient for its use in outdoor applications. When this film is stretched, it exhibits no whitening in the deformed region.

Example 2

According to the Invention

A two-layer film containing a layer composed of 80% KYNAR® 740 PVDF and 20% OROGLAS BS8, 15 μm in thickness, and a binder 35 μm in thickness according to the following formulation: 45.2% KYNAR® 740, 52% of an ethyl acrylate/MMA copolymer having 25% by weight of ethyl acrylate, and 2.8% of TINUVIN 234. This film has an elongation at break of 210%, a haze of 1.5 and, after seven days spent in an oven, no exudation is observable. This film has a UV absorbance sufficient for its use in outdoor applications. When this film is stretched, it exhibits no whitening in the deformed region.

Example 3

According to the Invention

A two-layer film containing a layer composed of 80% KYNAR® 740 PVDF and 20% OROGLAS BS8, 15 μm in thickness, and a binder 35 μm in thickness according to the following formulation: 40.2% KYNAR® 740, 57% of an ethyl acrylate/MMA copolymer having 25% by weight of ethyl acrylate and 2.8% of TINUVIN 234. This film having an elongation at break of 150%, a haze of 8 and, after seven days spent in an oven, no exudation being observable. This film has a UV absorbance sufficient for its use in outdoor applications. When this film is stretched, it exhibits no whitening in the deformed region.

Example 4

According to the Invention

A two-layer film containing a layer composed of 80% KYNAR® 740 PVDF and 20% OROGLAS BS8, 15 μm in thickness, and a binder 35 μm in thickness according to the following formulation: 40.2% KYNAR® 740, 47% of ORO-GLAS BS8, 10% of impact modifier D320 from CECA and 2.8% of TINUVIN 213. This film has an elongation at break of 150%, a haze of 6.5 and, after seven days spent in an oven, no exudation is observable. This film has a UV absorbance sufficient for its use in outdoor applications. This film, after a deformation of about 100%, exhibits whitening that makes the stretched part opaque.

Example 5

According to the Invention

A two-layer film containing a layer composed of 100% KYNARFLEX® 2850 PVDF, 15 μm in thickness, and a binder 35 μm in thickness according to the following formulation: 40.2% KYNAR® 740, 57% of an ethyl acrylate/MMA copolymer having 25% by weight of ethyl acrylate, and 2.8% of TINUVIN 234. This film haa an elongation at break of 150%, a haze of 8 and, after seven days spent in an oven, no exudation is observable. This film has a UV absorbance sufficient for its use in outdoor applications. When this film is stretched, it exhibits no whitening in the deformed region.

Example 6

According to the Invention

A two-layer film containing a layer composed of 100% KYNARFLEX® 2800 PVDF, 15 μm in thickness, and a binder 35 μm in thickness according to the following formulation: 40.2% KYNAR® 740, 57% of an ethyl acrylate/MMA copolymer having 25% by weight of ethyl acrylate, and 2.8% of TINUVIN 234. This film has an elongation at break of 150%, a haze of 8 and, after seven days spent in an oven, no exudation is observable. This film has a UV absorbance sufficient for its use in outdoor applications. When this film is stretched, it exhibits no whitening in the deformed region.

What is claimed is:

1. A coextruded film consisting of:
  a) between a 10 and 100 μm thick layer of a composition comprising:
    1) 40 to 50 parts by weight of PVDF;
    2) 60 to 50 parts by weight of a copolymer (A) comprising by 80 to 70% of methyl methacrylate (MMA) units per 20 to 30% of ethyl acrylate units; and
    3) 1 to 4 parts by weight of a UV absorber;
  the total of 1), 2), and 3) making 100 parts by weight,
  b) between a 2 and 50 μm thick PVDF-based layer comprising, as main constituents, 75-85 parts by weight of PVDF per 25 to 15 parts by weight of a polymethylmethacrylate (PMMA) copolymer, wherein said PMMA copolymer contains 85 to 95% by weight of MMA units and 5 to 15% by weight of methyl acrylate or ethyl acrylate units;
  wherein said layer of the composition a) is transparent to visible light but opaque to UV radiation is flexible, and is not whitened when the layer of the composition a) is folded or stretched.

2. The coextruded film according to claim 1, in which the layer of the composition a) is directly attached to said PVDF-based layer.

3. A coextruded film consisting of
  a) a layer of a composition comprising:
    1) 40 to 50 parts by weight PVDF;
    2) 60 to 50 parts by weight of a copolymer (A) comprising by weight 80 to 70% of methyl methacrylate (MMA) units per 20 to 30% of ethyl acrylate units; and
    3) 1 to 4 parts by weight of a UV absorber;
  the total of 1), 2) and 3) making 100 parts by weight,
  b) a layer placed against the layer a) and comprising, as main constituents, 75 to 85 parts by weight of PVDF per 15 to 25 parts by weight of a PMMA copolymer, wherein said PMMA copolymer contains 85 to 95% by weight of MMA units and 5 to 15% b weight of methyl acrylate or ethyl acrylate units; and
  c) an outer PVDF-based layer comprising, as main constituents, 85 to 100 parts by weight of PVDF per 15 to 0 parts by weight of PMMA respectively.

4. A substrate coated with said layer of the film according to claim 1, said coextrudable composition a) being placed against the substrate.

* * * * *